J. PARMELEE.
Hollow Screw-Pin Vise.
No. 207,620.   Patented Sept. 3, 1878.
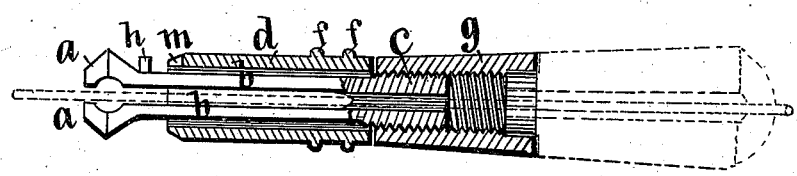
Witnesses:
R. G. Orwig,
Frank. W. Heers.
Inventor:
Julius Parmelee,
By Thomas G. Orwig,
Attorney.

UNITED STATES PATENT OFFICE.

JULIUS PARMELEE, OF DES MOINES, IOWA.

IMPROVEMENT IN HOLLOW-SCREW PIN-VISES.

Specification forming part of Letters Patent No. 207,620, dated September 3, 1878; application filed August 31, 1875.

*To all whom it may concern:*

Be it known that I, JULIUS PARMELEE, of Des Moines, in the county of Polk and State of Iowa, have invented an Improved Hollow-Screw Pin-Vise, of which the following is a specification:

The object of my invention is to provide a tool specially adapted for holding a wire during the process of shaping and cutting pins therefrom, as is frequently required by watch-makers, gun-smiths, and others who make and repair various articles of manufacture in which metal pins are used.

It consists in cone-headed spring-jaws having a tubular screw-shank formed integral therewith, being combined with an adjustable sleeve and an operating threaded hollow handle, as hereinafter set forth.

My drawing is a longitudinal central-section view, illustrating the construction and operation of my complete invention.

*a a* represent jaws having cone-shaped heads, formed integral with the straight parallel springs *b b*, and a tubular shank, *c*, having a male screw cut on its outside. The springs, the shank, and the handle may vary in length, as desired, to form complete tools of different sizes.

*d* is an adjustable sleeve slipped over the tubular screw-shank *c*, to slide upon the springs *b* and engage the cone-headed jaws *a*. It has serrated rims or enlargements *f f* formed integral therewith, or an uneven surface in some form, that will prevent it from slipping and turning in the operator's hand.

*g* represents a tubular handle, or the socket of a handle. It has a female screw cut in its bore, to mate the male screw on the end of the tubular shank *c*, and to perform the functions of a movable nut in moving the adjustable sleeve forward to engage the cones of the jaws *a*.

*h* is a stud fixed to the upper spring, *b*, at the base of the conoidal head of the jaw *a*.

*m* represents a slot in the front end of the sleeve *d*, designed to admit the stud *h* when the sleeve is pressed forward to compress the springs *b*, as required, to close the jaws *a* upon a rod or wire that extends through the complete tool, as indicated by broken lines. By means of this stud *h* and slot *m* the jaws are thereby prevented from turning in the sleeve when an object is clamped therein and manipulated by the operator.

The friction between the sleeve and the jaws is sufficient to prevent the jaws from turning in the sleeve in the ordinary use of the tool, and the application and use of the locking device *h m* are therefore optional.

In the practical operation of my invention, when the jaws are open and a wire is passed through, the wire is readily clamped and rigidly held to advantage in the complete tool by simply screwing the tubular threaded handle *g* forward on the tubular screw-shank *c*, to push the adjustable sleeve *d* upon the inclined rear sides of the conoidal-shaped jaws *a*, and thereby compress the springs *b*. The wire and complete tool thus rigidly united can then be seized and manipulated by the operator with one hand, while he applies a file or other tool with his free hand, to shape the projecting end of the wire into pins, rivets, or such other devices as he may want to make therewith.

I am aware that spring-jaws of conoidal shape have been formed integral with a solid screw-shank, and combined with a solid handle and an adjustable sleeve to produce a hand-vise.

I am also aware that a tubular screw-shank carrying pivoted jaws and springs on a cross-head has been combined with a tubular handle in such a manner that a wire could be passed through the longitudinal center of the complete tool and the jaws compressed upon it by turning the handle.

I claim as my invention—

1. In a hollow-screw pin-vise, the locking device consisting of the stud *h* on the spring-jaw *a b* and the slot *m* in the adjustable sleeve *d*, substantially as shown and described.

2. As an improved article of manufacture, a screw pin-vise composed of the cone-headed spring-jaws *a b*, having a tubular screw-shank, *c*, the adjustable sleeve *d*, and the operating tubular threaded handle *g*, substantially as and for the purposes shown and described.

Des Moines, Iowa, August 26, 1875.

JULIUS PARMELEE.

Witnesses:
THOMAS G. ORWIG,
C. A. JOHNSON.